May 9, 1961 F. J. KLEIN 2,983,517
PHONOGRAPH TONE ARM
Filed July 9, 1958 2 Sheets-Sheet 1

INVENTOR.
FREDERICK J. KLEIN
BY John W. Michael
ATTORNEY

INVENTOR.
FREDERICK J. KLEIN
BY John W. Michael
ATTORNEY

United States Patent Office 2,983,517 Patented May 9, 1961

2,983,517

PHONOGRAPH TONE ARM

Frederick J. Klein, P.O. Box 271, Elkhart Lake, Wis.

Filed July 9, 1958, Ser. No. 747,513

2 Claims. (Cl. 274—23)

This invention relates to phonograph tone arms for use with records of the disc type, and more particularly it relates to an improved tone arm for the elimination of tracking error.

Tracking error is a well-known problem in this field. A record groove carries lateral vibrations that should move the stylus back and forth at right angles to the groove. As the groove is a very slight spiral and thus almost a perfect circle, with its center corresponding with the center of the disc, the stylus should move back and forth along a radius from the record's center. Any deviation from this radial vibration of the stylus is known as "tracking error" or "mistracking." The result is distortion and unpleasant noise in the reproduced sound and increased record wear.

Various arrangements have been proposed for reducing or completely eliminating tracking error. Such previous arrangements have utilized pulleys associated with driving belts, sliding contacts with compensating grooves, roller mechanisms on rails, gears, and the like. Other less complex arrangements such as the offset pick-up reduce but do not eliminate tracking error.

It is the object of this invention, therefore, to provide an arrangement which eliminates tracking error and yet is simple and inexpensive to manufacture requiring a minimum of pivoted connections to thereby insure smooth, accurate and reliable operation with a minimum of friction between the moving parts.

These objects are attained by a tone arm member pivotally mounted at a point adjacent the record turntable for angular movement over the record. A reproducing head or pick-up is pivotally mounted on the free end of the tone arm for rotation about a substantially vertical axis. A stylus having a tip portion adapted for tracking a record groove is mounted on the pick-up with the tip portion of the stylus lying substantially on the vertical axis about which the pick-up rotates. The pickup and stylus are so positioned on the tone arm so that the stylus tip follows a circular path which intersects the center of the turntable as the tone arm is pivoted about its mounting point. Means including a link pivotally connected to the pick-up and pivotally mounted at a fixed point are provided to rotate the pick-up as the stylus tracks the record groove. The length and fixed mounting point of the link are such as to rotate the pick-up so that the stylus will at all times vibrate at right angles to the record groove i.e., along a radial path from the record's center.

Other objects and advantages will be pointed out in, or be apparent from the specification and claims, as will obvious modifications of the single embodiment shown in the drawings, in which:

Fig. 5 is a vertical sectional view taken along line 5—5 of Fig. 3;

Fig. 6 is a view taken along line 6—6 of Fig. 2;

Fig. 7 is a fragmentary sectional view taken along line 7—7 of Fig. 6; and

Fig. 8 is a schematic representation of the tone arm showing how the proper relationship between the various parts is arrived at.

Figure 1:
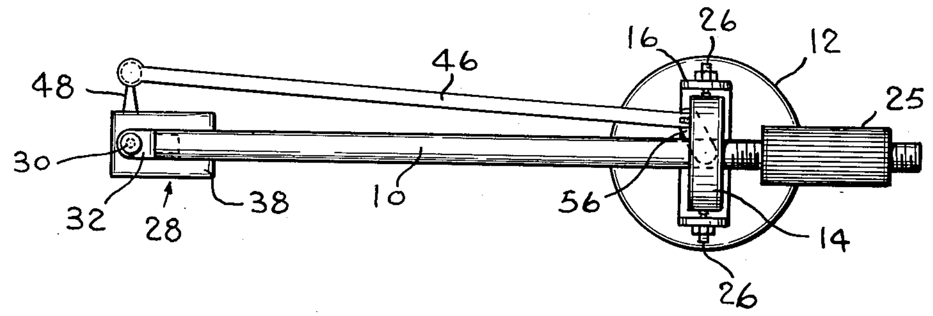
Fig. 1 is a top plan view of a phonograph tone arm embodying my invention.
Figure 2:
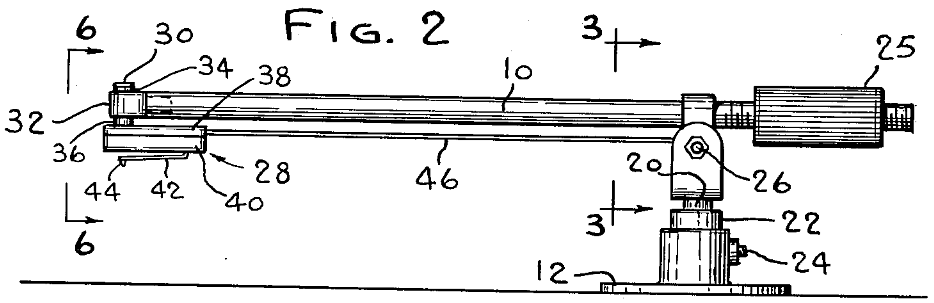
Fig. 2 is a side elevation view of the tone arm shown in Fig. 1.

Referring now to the drawings, the tone arm includes a rigid arm 10 formed of a hollow bar and pivotally mounted for rotation about a vertical axis in a base 12. The means for so mounting arm 10 can be of any suitable form such as that shown in Figs. 3 and 5 wherein arm 10 is fastened to the underside of the upper of two pivotally interconnected U-shaped brackets 14 and 16, respectively. Lower bracket 16 is pivotally mounted in base 12 by means of a ball bearing assembly 18 mounted on the end of a stub-shaft 20 which, in turn, is pressed into a collar 22 held in base 12 by a set-screw 24. Arm 10 can be pivoted about a horizontal axis to permit either manual or automatic changing of records by virtue of the pivoted connection between the two brackets by any suitable means such as the needle-type bearings 26 shown in Fig. 3. A counterweight 25 threaded on the end of arm 10 is provided to properly balance the arm.

Figures 5, 6, 7, 8:
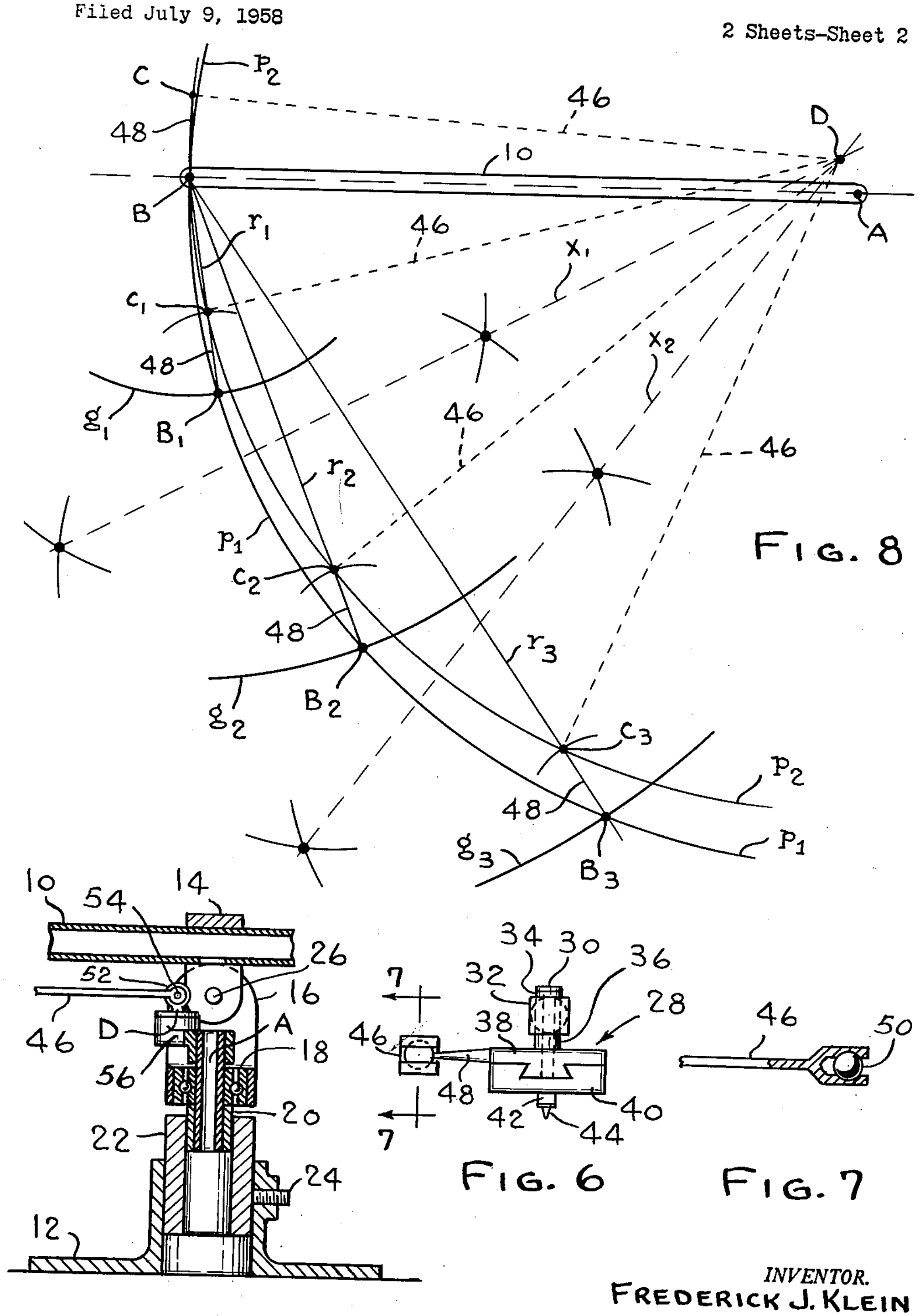

A reproducing head or pick-up 28 of conventional design is mounted at the free end of arm 10 by any suitable means such as a headed pin 30 extending through an opening in the flattened end 32 of the arm and fixed at its lower end to pick-up 28 (Fig. 6). A pair of bearings 34 and 36 of Teflon or other suitable material may be mounted on either side of flattened end 32 of the arm to reduce friction at the pivoted connection.

Pick-up 28 has an upper portion 38 and a replaceable lower portion 40 having a stylus 42 with a tip 44 mounted on the underside thereof. Stylus mount 40 is slidably attached to upper portion 38 by means of a tongue and groove connection as shown in Fig. 6 to facilitate replacement of the stylus.

While the particular type of pivoted connection between pick-up 28 and arm 10 is of no significance to this invention, the particular relationship between the stylus tip, pivotal axis and center of the turntable is important to the proper operation of the tone arm in the elimination of tracking error. It is important in this connection that the tip 44 of the stylus lies on the pivotal axis about which the pick-up is rotated with respect to the arm as the arm itself is pivoted during the playing of a record. This means that the stylus tip will follow a circular path with respect to the pivotal mount of arm 10. It is important that this circular path intersect the center of the turntable. The significance of this relationship will be fully demonstrated in the explaantion of Fig. 8 hereinafter.

Figure 3:
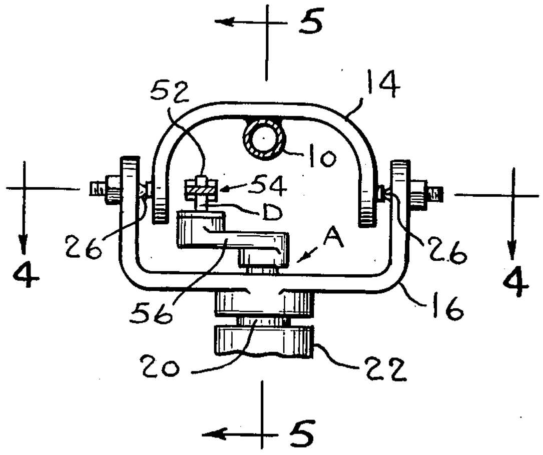
Fig. 3 is a vertical sectional view taken along line 3—3 of Fig. 2.
Figure 4:
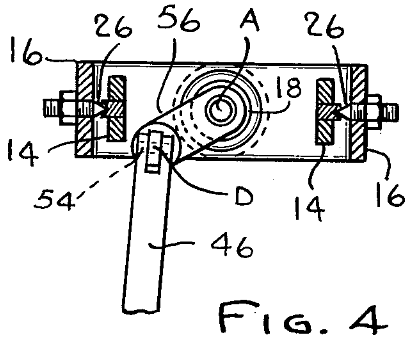
Fig. 4 is a horizontal sectional view taken along line 4—4 of Fig. 3.

The means for rotating pick-up 28 as arm 10 swings over the record includes a link member 46 pivotally connected between a short arm 48 fastened to the upper portion 38 of the pick-up and a fixed point located adjacent the pivotal mount of arm 10. The pivoted connection between link 46 and arm 48 is shown in the form of a ball-and-socket type connection 50 which permits link 46 to be freely tilted in a vertical plane with arm 10 when changing records. A pivotal connection about both a vertical and horizontal axis is provided at the other end of link 46 by connecting the forked end of the link to a rotatably mounted vertical post 52 by means of a pin 54 passing through the end of the link and the post as shown in Figs. 3 and 4. Post 52 (Figs. 3 and 5) is mounted for rotation about a fixed vertical axis by means of an offset mounting member 56 fitted on the upper end of stub-shaft 20, as shown. It is noted that the horizontal pivot points of link 46 (pin 54) and arm 10 (needle-type bearings 26) are located at the same level. This arrangement further facilitates free and unlimited tilting of the arm and link in a vertical plane to permit placement and removal of records on and from the turntable.

Thus, it will be seen that as arm 10 is rotated about the vertical axis of base 12 during the playing of the record, link 46 will rotate stylus tip 44 about the vertical axis of rotation of pick-up 23. As will now be explained, by establishing the proper relationship between the rotation of pick-up 23 and arm 10 with respect to the record, the position of the stylus can be continuously maintained in the record groove whereby it will always vibrate in a radial path at right angles to the record groove and thereby eliminate tracking error.

The particular relationship between the various parts of the structure described above which provides the proper rotation of pick-up 23 by link 46 to eliminate tracking error can best be described by reference to Fig. 8. Fig. 8 shows arm 10 pivotally mounted at a point A for swinging movement about point A as the arm travels over a record during the playing thereof. The length of arm 10 can vary within limits determined by practical considerations of space and arm weight. These considerations usually require that the fixed pivotal axis A of arm 10 be located near the edge of the record turntable.

The letter B designates the pivotal axis of the pickup 23 (not shown in Fig. 8) mounted at the end of arm 10. The stylus (not shown in Fig. 8) is mounted on the pick-up so that the stylus tip lies on vertical axis B. It is important that the pick-up be mounted on arm 10 so that axis B passes through the center of the record (and record turntable) at one point in the arm's travel. In other words, the stylus tip follows a circular path $p_1$ which intersects the center of the record. Thus, with the arm 10 in the position shown in Fig. 8, the axis of rotation B of the pick-up on the arm, the axis of rotation of the stylus tip, and the axis of rotation of the record all coincide.

The length of short arm 48 fixed to the pick-up need not be of any specific length but, like arm 10, must for practical reasons of space and weight be within certain limits. It has been found that by making short arm 48 about 1/8 to 1/10 the length of arm 10 an effective and compact arrangement results.

Up to this point it will be noted that the only specific relationships that must be met are that with arm 10 in the Fig. 8 position, the axes of rotation of both record and pick-up must coincide. The next step is to mount link 46 so that the pick-up will be rotated on the arm in the desired manner.

The pivotal connection between short arm 48 and link 46 is designated by the letter C and the fixed point at which the end of lever 46 is pivotally mounted is designated by the letter D. The point D at which lever 46 must be mounted to produce the desired result is determined as follows.

The vertical axis of rotation of the pick-up is shown in four different positions represented by letters B, $B_1$, $B_2$ and $B_3$, with the stylus tip 44 lying in the record groove shown as arcs $g_1$, $g_2$ and $g_3$ for the respective positions. Now, assuming that the proper path of vibration of the stylus is along the longitudinal axis of short arm 48 and that the axis of arm 48 intersects the pivotal axis B of the pick-up, then in all positions of arm 10 during its travel the axis of arm 48 must lie on a radius of a circle having its center at the center of the record (and turntable). Thus, with the pivotal axis B lying in positions $B_1$, $B_2$ and $B_3$, as shown, the pick-up must be positioned so that short arm 48 lies on radii $r_1$, $r_2$ and $r_3$ for each of the respective positions. In each of these positions the pivotal connections between arm 48 and link 46 is designated by letters $C_1$, $C_2$ and $C_3$ which will lie on a circle having its center at D.

The circle defined by points C, $C_1$, $C_2$ and $C_3$ may be constructed by constructing perpendicular bisectors $x_1$ and $x_2$ of lines intersecting any pair of these points. These bisectors $x_1$ and $x_2$ intersect at the center D of the circle. Therefore, by mounting link 46 at point D the pivot point C will follow a circular path $p_2$ and thereby maintain the stylus in a position whereby it will vibrate along a radius of a circle having its center at the center of the turntable.

It should be understood that the distance between the points D and A will vary depending on the particular length of tone arm 10 and short arm 48 selected. As stated previously, such lengths must for practical reasons of space and weight be within certain limits and will depend largely on the size of the turntable. It has been found, however, that although the distance between points A and D will vary as explained above, the angular relationship between the center of the turntable (point B in Fig. 8), the pivot point A of arm, and the pivot point D of link 46 will remain substantially constant. Thus as shown in Fig. 8, a vertical plane passing through points D and A makes an angle of about 58 degrees with respect to a vertical plane passing through point A and the center of the turntable (point B on Fig. 8).

Although but one embodiment of the present invention has been illustrated and described, it will be apparent to those skilled in the art that various changes and modifications may be made therein without departing from the spirit of the invention or from the scope of the appended claims.

I claim:

1. A tone arm mechanism for a phonograph having a turntable for playing disc-type records comprising, an arm pivoted at a point for angular motion about said point, a pick-up pivotally mounted on the free end of said arm, a stylus mounted on said pick-up and having a tip portion adapted for tracking a groove in a record, said tip portion of said stylus describing a circular path which intersects the center of said turntable as said arm is pivoted about said point, a link pivotally mounted at a fixed point and having the free end thereof pivotally connected to said pick-up, said link pivotally connected to said pick-up at a point which, in all positions of said tone arm, lies in a vertical plane which intersects the center of said turntable and the pivotal axis of said pick-up, said tip portion of said stylus positioned on said pick-up so that in all positions of said tone arm the path in which said stylus is designed to vibrate will lie in the above defined vertical plane, said fixed point at which said link is mounted located at the center of a circle which passes through a plurality of reference points, each of said reference points located by first pivoting said arm and pick-up to different playing positions over said turntable and in each position rotating said pick-up with respect to said arm so that the path in which said stylus is designed to vibrate extends along a radius of said turntable, in each of said positions the reference point being at the pivotal connection between said pick-up and said link, said fixed point at which said link is mounted lying in a vertical plane which intersects the pivot point of said tone arm and makes an angle of about 58 degrees with a vertical plane passing through the pivot point of the tone arm and the center of the turntable.

2. A tone arm mechanism for a phonograph having a turntable for playing disc-type records comprising, an arm pivoted at a point for angular motion about said point, a pick-up pivotally mounted on the free end of said arm, a stylus mounted on said pick-up and having a tip portion adapted for tracking a groove in a record, said tip portion of said stylus describing a circular path which intersects the center of said turntable as said arm is pivoted about said point, a link mounted at a fixed point and having the free end thereof pivotally connected to said pick-up, said link pivotally connected to said pick-up at a point which in all positions of said tone arm lies in a vertical plane which intersects the center of said turntable and the pivotal axis of said pick-up, said tip portion of said stylus positioned on said pick-up so that in all positions of said tone arm the path in which said stylus is designed to vibrate will lie in the above defined vertical plane, said fixed point at which said link is mounted located at the intersection of the perpendicular bisectors drawn to a plurality of lines, said lines between pairs of reference points located by first pivoting said arm and pick-up to different plane positions over said turntable and in each position rotating said pick-up with respect to said arm so that the path in which said stylus is designed to vibrate extends along a radius of said turntable, in each of said positions the reference point being at the pivotal connection between said pick-up and said link, said fixed point at which said link is mounted lying in a vertical plane which intersects the pivot point of said tone arm and makes an angle of about 58 degrees with a vertical plane passing through the pivot point of the tone arm and the center of the turntable.

References Cited in the file of this patent

UNITED STATES PATENTS 1,386,892 Moffitt ---------------- Aug. 9, 1921
2,516,565 Guy ------------------ July 25, 1950